United States Patent Office 2,812,286
Patented Nov. 5, 1957

2,812,286

PROCESS FOR THE INTRODUCTION OF AN 11α-OH GROUP INTO CYCLOPENTANOPHENAN-THRENE DERIVATIVES BY CUNNINGHAMELLA ECHINULATA

Alejandro Zaffaroni and Benjamin A. Rubin, Mexico City, Mexico, assignors to Syntex, S. A., Mexico City, Mexico, a corporation of Mexico No Drawing. Application September 4, 1953,
Serial No. 378,678

Claims priority, application Mexico September 9, 1952

7 Claims. (Cl. 195—51)

The present invention relates to a novel method of preparation of cyclopentanophenanthrene derivatives. More particularly, the present invention relates to the introduction of oxygen in position C–11 of steroidal compounds, especially of the pregnane series, by the action of the fungus *Cunninghamella echinulata*.

In the United States Patent No. 2,602,769 of Murray and Peterson issued July 8, 1952, there is disclosed the introduction of oxygen into the steroid molecule by means of Mucorales fungi. Although the aforementioned patent refers generally to the introduction of oxygen into the steroid molecule by various members of the Mucorales order, it would appear from this patent that the action of the various fungi of this order is selective with regard to specific steroids and with the position oxygenated. As for example, a specific strain of *Rhizopus arrhizus*, i. e. RH 176 in accordance with the disclosure of this patent, introduces a hydroxy group in position 11α of the molecule of progesterone while its action on a steroid such as desoxycorticosterone is apparently the introduction of oxygen at the 6 position to produce 6-hydroxy-11-desoxy-corticosterone. Although this patent also discloses the action of certain species of the Cunninghamella genus, it is to be noted that the only specifically disclosed action is that of *Cunninghamella blakesleana* ATCC 9245 which introduces the 11β-hydroxy group into Reichstein's compound S, i. e. converts in rather small yield $\Delta^4$-pregnene-17α,21 - diol - 3,20 - dione into $\Delta^4$ - pregnene - 11β,17α, 21 - diol - 3,20 - dione. It would therefore, be expected in accordance with the aforementioned patent that the action of species of the Cunninghamella genus would be to produce 11β-hydroxy steroidal compounds.

In accordance with the present invention, the surprising discovery has been made however, that *Cunninghamella echinulata* and particularly a specific strain, i. e. ATCC 1387 preferentially produced in good yield 11α-hydroxy steroids from the corresponding steroids, unsubstituted in ring C, i. e. steroids having an 11 methylene group.

It has further been discovered in accordance with the present invention that the oxygenating action of *Cunninghamella echinulata* is especially effective on members of the pregnane series, i. e. compounds provided at position 17 of the steroid nucleus with the side chain C—CO—CH₂R wherein R may be a hydroxy group or may be hydrogen. Within this series these compounds may be of course, otherwise substituted on the ring structure and especially with a 3-keto group, as well as unsaturated as for example in the 4 position. They may be further provided with a 17α-hydroxy group or such other substituents as characterize the pregnane series compounds.

In practicing the process of the present invention various conditions well-known in the art for promoting the active growth of the fungus may be utilized, as for example the conditions specifically set forth in the Murray and Peterson Patent No. 2,602,769. Thus, in general, a suitable nutrient medium is provided and inoculated with the fungus and thereafter kept under aerobic conditions in order to permit active growth of the fungus. Thereafter, the steroid to be oxygenated is added preferably in solution in a suitable solvent such as ethyl alcohol, dispersed in the medium by agitation, and the incubation is prolonged for a substantial period, as for example 24 hours, under the same conditions which allowed profuse growth of the fungus. The reaction medium is then extracted with a suitable solvent for the steroid such as dichloroethylene. The extracts are then evaporated to dryness and the residue is purified as by solution in a solvent and chromatography on a suitable column. The following specific procedure was found to be satisfactory for the oxygenation and separation of the oxygenated steroids:

*Preparation of the reaction medium for the oxidation of steroids.*—A liquid medium was prepared containing per 1000 cc., 20 g. of peptone and 50 g. of Karo syrup in sterile tap water. The medium was divided in 200 cc. portions in 1000 cc. Erlenmeyer flasks and after sterilizing the contents of each flask was inoculated with a suspension of spores of *Cunninghamella echinulata* ATCC 1387 in sterile water. The mixture was incubated at 28° C. during 24 to 48 hours in a machine with rotatory agitation. In the same way, 30 lts. of the liquid medium were prepared in a 50 lt. Pyrex bottle and then mixed and homogenized with the contents of five of the Erlenmeyer flasks previously mentioned (total volume of liquid 1000 cc.). This mixture was incubated for 24 hours at 28° C. while stirring with a stainless steel mechanical stirrer at 174 R. P. M. and with a metallic attachment to introduce and disperse sterile air at a rate of 100 lt. per minute. At the end of the incubation period an abundant growth of fungi was noticed and the pH of the culture was between 3.0 and 4.0 Under these conditions, the reaction medium is ready for its immediate use in the oxidation of steroids.

*Oxidation of steroids.*—At the end of the incubation period which allowed the growth of the fungus, the steroid to be oxygenated is added. For this purpose 10 g. of the steroid were dissolved in 100–200 cc. of ethyl alcohol and the alcoholic solution was added to the bottle containing the reaction medium prepared in accordance with the method described in the previous paragraph. The incubation was prolonged for 24 hours keeping the same temperature and the same stirring and aeration rate as previously set forth. At the end of 24 hours the incubation was terminated and reaction medium was extracted with five successive portions of 10 lt. each of dichloroethylene. On evaporation to dryness of the combined extracts, a residue was left weighing between 15 and 20 g. This residue was dissolved in benzene and chromatographed on a column with 1 kg. of F–20 aluminum oxide. The first fraction eluted from the column by routine methods always consisted of unchanged steroidal starting material and the second fraction consisted of oxygenated steroids. In some instances several fractions were obtained of different oxygenated compounds. In each instance the steroids were separated and purified by conventional methods such as crystallization etc.

In the following specific examples, which serve to illustrate but are not intended to limit the present invention, the foregoing conditions were followed in each case except where otherwise specified.

Example I

Starting from 10 g. of progesterone, 7.5 g. of steroids were recovered, of which 3.6 g. were identified as 11α-hydroxyprogesterone ($\Delta^4$ - pregnene - 11α - ol - 3,20-dione) with a melting point of 165–166° C.

Example II

Starting from 10 g. of 17α - hydroxyprogesterone (Δ⁴ - pregnene - 17α - ol - 3,20 - dione), 6.2 g. of steroids were obtained, 2.3 g. of which proved to be Δ⁴-pregnene-11α, 17α - diol - 3,20 - dione with a melting point of 215°–217° C.

Example III

Starting from 10 g. of desoxycorticosterone, 8.1 g. of steroids were obtained, of which 2.9 g. of consisted of Δ⁴ - pregnene - 11α,21 - diol - 3,20 - dione having a melting point of 150°–152° C.

Example IV

Starting from 10 g. of Reichstein's compound S (Δ⁴ - pregnene - 17α,21 - diol - 3,20 - dione) there was obtained 8.0 g. of steroids out of which 3.2 g. proved to be the 11α epimer of Kendall's compound F (Δ⁴ - pregnene - 11α, 17α, 21 - triol - 3,20 - dione) with a melting point of 216°–217° C. In this experiment it was observed that the separation of Reichstein's compound S from Kendall's compound F was achieved in better yield by chromatography on silica gel instead of the aluminum oxide which was used in the previous examples.

We claim:

1. A process for the production of steroidal pregnene series 11α-hydroxy compounds from the corresponding steroidal 11-methylene compounds which comprises dispersing the steroidal pregnene series 11-methylene compound in nutrient medium containing a growth of *Cunninghamella echinulata*, maintaining the steroid and fungus mixture under growth conditions to thereby subject the steroid to the oxidizing action of the fungus, and thereafter separating said steroidal pregnene series 11α-hydroxy compound from the mixture.

2. The process of claim 1 wherein the steroidal compound is a Δ⁴ - 3 - ketone of the pregnane series.

3. The process of claim 1 wherein the starting material is selected from the group consisting of Δ⁴-pregnene-3,20-dione, Δ⁴ - pregnene - 17α - ol - 3,20 - dione, Δ⁴ - pregnene - 21 - ol - 3,20 - dione, and Δ⁴ - pregnene- 17α, 21-diol - 3,20 - dione and the corresponding 11α-hydroxy compounds are respectively produced.

4. The process of claim 1 wherein the starting material is Δ⁴ - pregnene - 3,20 - dione and the product is Δ⁴-pregnene - 11α - ol - 3,20 - dione.

5. The process of claim 1 wherein the starting material is Δ⁴- pregnene-17α-ol-3,20 - dione and the product is Δ⁴-pregnene-11α, 17α-ol-3,20-dione.

6. The process of claim 1 wherein the starting material is Δ⁴ - pregnene-21 - ol - 3,20 - dione and the product is Δ⁴ - pregnene - 11α, 21 - diol - 3,20 - dione.

7. The process of claim 1 wherein the starting material is Δ⁴ - pregnene - 17α, 21 - diol - 3,20 - dione and the product is Δ⁴-pregnene-11α,17α,21-triole-3,20-dione.

References Cited in the file of this patent

UNITED STATES PATENTS 2,602,769      Murray et al.      July 8, 1952